(No Model.)
P. ERICHSEN.
VALVE FOR REGULATING THE OUTFLOW OF LIQUIDS.
No. 514,352. Patented Feb. 6, 1894.
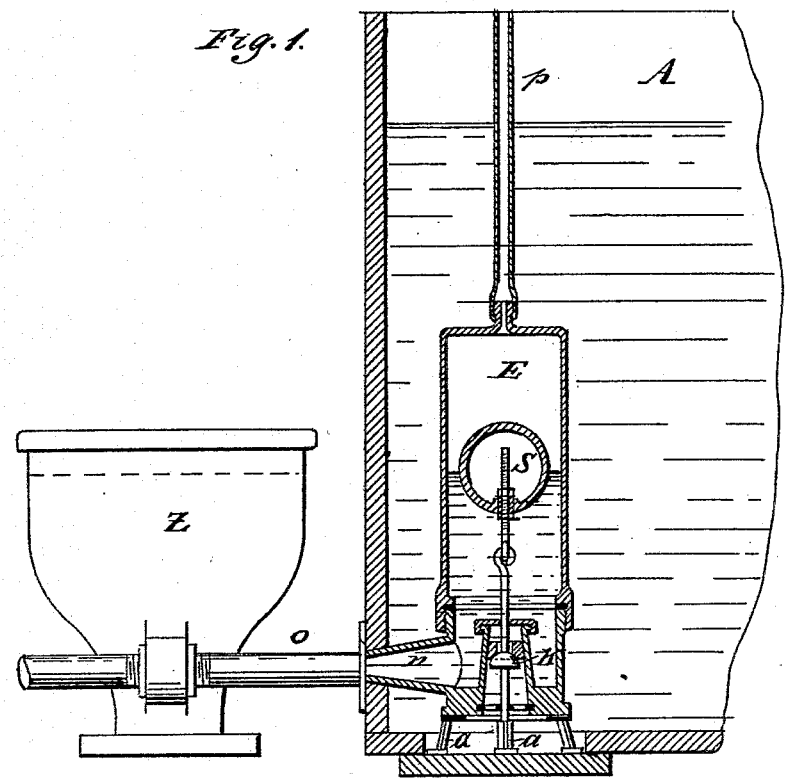
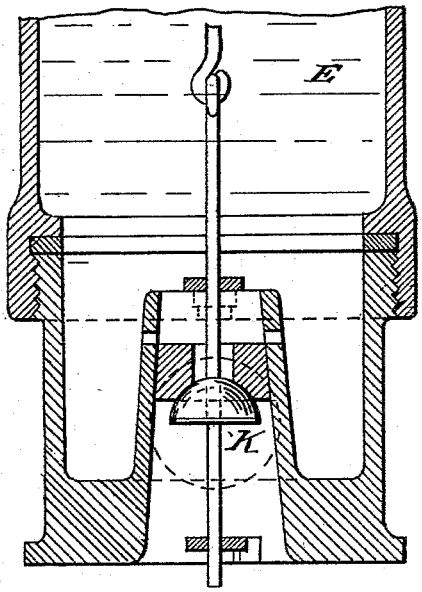
Witnesses:
Inventor: Peter Erichsen
per G. Dittman
Attorney.

UNITED STATES PATENT OFFICE.

PETER ERICHSEN, OF LUNDEN, ISLAND OF ALSEN, GERMANY.

VALVE FOR REGULATING THE OUTFLOW OF LIQUIDS.

SPECIFICATION forming part of Letters Patent No. 514,352, dated February 6, 1894.

Application filed April 6, 1892. Serial No. 428,049. (No model.) Patented in Germany March 21, 1891, No. 59,969; in Denmark February 24, 1892, and in England March 14, 1892, No. 5,004.

*To all whom it may concern:*

Be it known that I, PETER ERICHSEN, of Lunden, on the Island of Alsen, Germany, have invented certain new and useful Improvements in Valves for Regulating the Outflow of Liquids, (which have been previously patented to me in Germany, No. 59,969, dated March 21, 1891; in England, No. 5,004, dated March 14, 1892, and in Denmark, dated February 24, 1892, not numbered,) of which the following is a specification.

This invention relates to valves arranged in a conduit under pressure, or in a tank or reservoir, from which a number of vessels are fed, such as cattle watering troughs for instance, and the valves have the object to close the feed, as soon as the liquid has reached a determined level.

In the accompanying two sheets of drawings, Figure 1 is a vertical section through the device, having the valve placed inside the reservoir, from which the flow is to be regulated. Fig. 2 shows in a larger scale a vertical section through the lower part of the valve case, with the valve.

A is a tank or reservoir holding the supply of liquid. E is an inverted vessel, placed inside the said tank and communicating with the outer atmosphere by a pipe *p*. The bottom of this vessel is provided with a valve K, which is connected to a float S. This valve, when closed will prevent the liquid from passing from tank A into the vessel E but when open will allow it to flow, the bottom part under the valve being open and being supported by studs *a*. The inner space of the vessel E, by means of the short pipe *n*, is in free communication with the conduit *o* through which the troughs Z, &c., are fed. The level in the same will be evidently of the same height as the level in E, wherein the float is so arranged, that the valve *k* is lifted against its seat and closed, when the level is at the desired height. If the liquid in one of the troughs Z is decreased, the level in E sinks correspondingly, the float S opens the valve K so that a new supply from tank A can flow in, till the normal height is reached again, when the ascending float will intercept the flow. The normal height of liquid can easily be predetermined by screwing the float S more or less down on its rod. Access to the inner parts is obtained, by unscrewing the top of the vessel E. This vessel is besides inserted into tank A in such a way, that it can easily be withdrawn for the purpose of cleaning.

Having thus described my invention, what I claim is—

The combination with a reservoir, of a vessel having studs on its bottom whereby it is supported above the bottom of said reservoir and having closed side walls and a pipe communicating with the atmosphere, said vessel having also a central upwardly projecting inlet pipe and an outlet pipe extending through the wall of said reservoir, a valve seat in said inlet pipe and a float valve in said vessel for controlling the inlet thereto, substantially as set forth.

In testimony whereof I have signed my name to this specification in the presence of two subscribing witnesses.

PETER ERICHSEN.

Witnesses:
G. HERMES,
N. EHLERS.
*Both of Flensburg.*